J. F. JENNINGS.
EMERGENCY STOP FOR AUTOMOBILES.
APPLICATION FILED APR. 6, 1916.
1,211,710.
Patented Jan. 9, 1917.
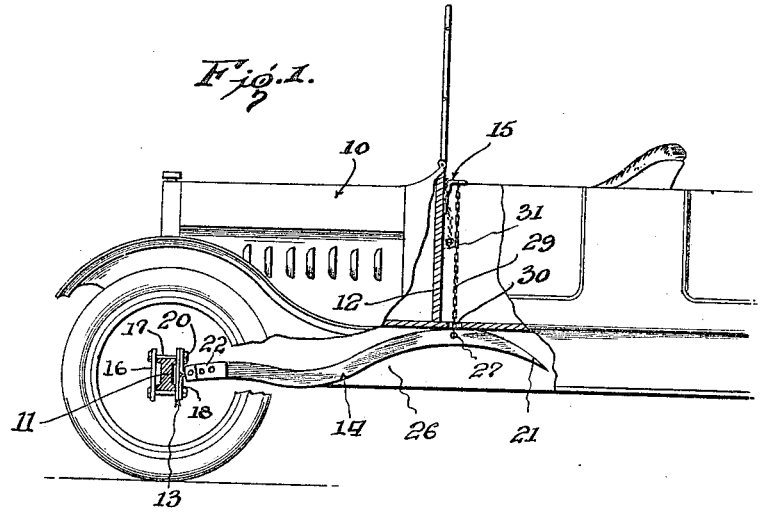
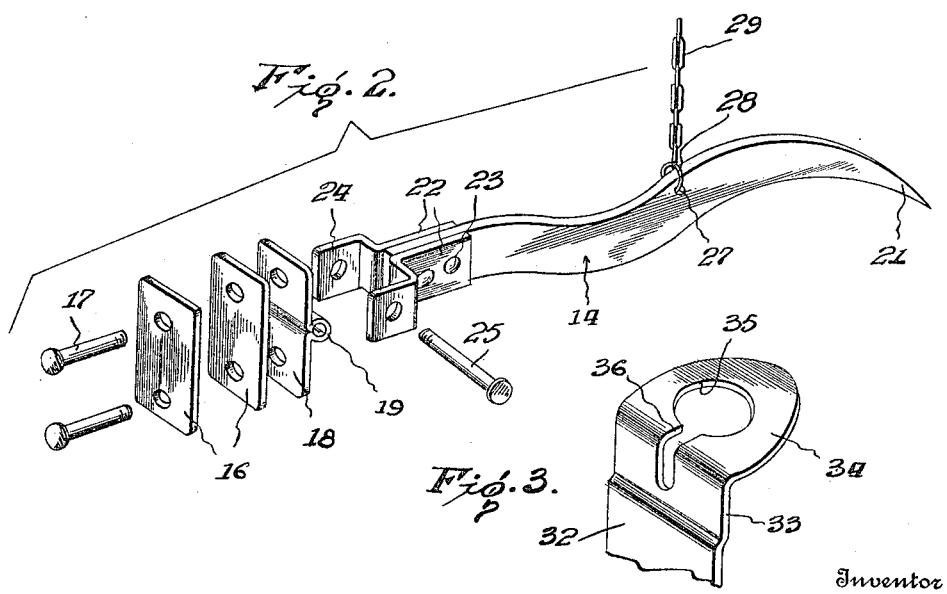
Inventor
J. F. Jennings.
By
, Attorneys

UNITED STATES PATENT OFFICE.

JOHN F. JENNINGS, OF SMITHFIELD, ILLINOIS.

EMERGENCY-STOP FOR AUTOMOBILES.

1,211,710.   Specification of Letters Patent.   Patented Jan. 9, 1917.

Application filed April 6, 1916. Serial No. 89,482.

*To all whom it may concern:*

Be it known that I, JOHN F. JENNINGS, a citizen of the United States, residing at Smithfield, in the county of Fulton and State of Illinois, have invented certain new and useful Improvements in Emergency-Stops for Automobiles, of which the following is a specification.

My invention relates to new and useful improvements in brakes for vehicles and more particularly for motor vehicles, the primary object of my invention being the provision of a sprag brake or Brad stop which may operate to check rearward movement of a vehicle, due to failure of the engine or breaking of vital parts of the transmission while the vehicle is ascending a hill.

A still further object of my invention is to provide a brake of the above described character which may be readily controlled and operated by the driver without the necessity of his leaving his seat and which may also be employed in holding the car against rearward movement so that all other brakes may be released, making it possible to start the car against any up grade.

A further object of my invention consists in so mounting and arranging the sprag or Brad brake that it operates from the forward portion of the car and, therefore, may be of such length as to engage the ground at a more acute angle than is customary with sprag brakes and so prevent tilting of the vehicle upwardly over the brake if the latter is suddenly thrown into operation.

In this connection, a still further object of my invention is to provide a means for controlling the brake to limit the extent to which it may pass into the road bed when in use.

With these and other objects in view, my invention will be more fully described, illustrated in the accompanying drawings, and then specifically pointed out in the claim which is attached to and forms a part of this application.

In the drawings: Figure 1 is a fragmentary elevational view, partially in section, of a conventional form of motor vehicle with my brake in place; Fig. 2 is an unassembled perspective view of the brake proper; Fig. 3 is a fragmentary perspective view of a bracket employed as a portion of the support for the brake.

Corresponding and like parts are referred to in the following description and indicated in all the views of the drawings by the same reference characters.

In order to insure a clear and accurate understanding of my invention and its method of operation, I have illustrated it in connection with a conventional form of motor vehicle 10, having the usual forward axle 11, I-shaped in cross section, and a dash 12. My invention, broadly, comprehends a clamp 13 adapted for connection to the forward axle of the vehicle, the sprag brake proper 14 and brake controlling means 15.

The clamp 13 comprises a pair of metal plates 16 adapted to engage against the front and rear sides of the axle and having, adjacent their upper and lower ends, alined openings to receive clamping bolts 17. The clamp also includes a hinge plate 18 formed intermediate its height with a transverse pintle sleeve 19, but otherwise corresponding in size and shape to the clamping plates 16, having openings to aline with the openings of the plates 16. The bolts 17, when the plates are applied in the manner shown in Fig. 1, are passed through the openings of the plates and secured by nuts 20.

The sprag proper is preferably formed of iron or steel, being generally rectangular in cross section and having, at its rear end, a downwardly bent chisel-shaped point 21 adapted to engage in the earth or other material forming the road bed. The opposite end of the brake 14 is secured between the rear ends of hinge plates 22 by means of rivets 23. These hinge plates, intermediate their length, are bent outwardly and their free ends are extended in parallel spaced relation to form hinge ears 24. A pivot bolt 25 is passed through openings formed in these hinge ears and through the pintle sleeve 19 of the plate 18 and locked in place by a nut, cotter pin or other means, not shown, to hingedly connect the sprag brake 14 to the clamp 11. As shown, this sprag brake preferably extends from the rear face of the rear axle 11 to a point beneath the floor of the car adjacent the driver's seat. As a rule, the clamp 13 is so applied to the rear axle as to space the brake at one side or the other of the apron 26 or drip pan of the engine and its transmission mechanism in order that the brake may be raised upwardly against the lower face of the floor of the vehicle and held in such position against rattling.

The brake proper 14 is formed with an opening 27 to receive a ring 28 to which is connected a chain 29 which is passed through an opening 30 formed in the floor of the vehicle and which, at its free end, carries a ring shaped handle 31. Obviously, the brake may be lowered by releasing this chain or raised by pulling upwardly upon the chain and one of the objects of my present invention consists in the provision of a securing bracket for holding the chain in any adjusted position. This securing bracket or supporting means 15 is best illustrated in Fig. 3 and is preferably formed of heavy sheet metal stamped and bent to the proper shape. It includes a body 32 adapted to be secured to the vehicle dash 12 and adjacent its upper portion having an offset portion 33 which extends in spaced relation to the dash and terminates in a rearward extension 34 projecting at right angles to the dash. This rearward extension or head of the anchoring bracket 15 is formed with an opening 35 for the passage of the chain 29 and with a slot 36 communicating with the opening and extending into the offset portion 33 of the bracket. This slot is of such width that when a chain link is swung into it, the next adjacent link will engage against the bracket at the sides of the slot and hold the chain against movement through the bracket. Under ordinary conditions, the brake 14 is held in raised position, as shown in Fig. 1, one link of the chain being positioned in the slot 36 and the chain being swung laterally to one side to lie between the offset portion 33 of the bracket and the dash in such a manner as to be held against movement which would free it from the slot 36. If, when ascending a hill, the vehicle should start coasting backwardly down the hill, due to failure of motive power or breaking of a vital portion of the transmission mechanism between the source of power and drive wheels, the driver may, by grasping the free end of the chain and swinging it upwardly and forwardly, release the chain from the slot 36 and lower the brake into engagement with the road. The depth to which the brake may be forced into the road bed, by the rearward movement of the vehicle, may be limited by swinging the chain into the slot 36 after the brake has become active. Obviously, as soon as the vehicle is again started in a forward direction, the brake will be withdrawn from the ground and may be readily raised and secured in normal inactive position by proper manipulation of the chain 29. It should be noted that when the brake is in use, the force which it exerts upon the vehicle, tending to tilt the forward end of the vehicle upwardly from the road, is in effect counteracted by the locking of the chain 29 in the bracket 15 as there can be no upward tilting of the forward end of the vehicle with respect to the brake 14 when the chain is locked. Obviously, the sprag brake, when mounted in the manner illustrated and described, is of value not only for stopping a vehicle which is coasting rearwardly down a hill, but also for facilitating the starting of a vehicle when on an up grade. Under such conditions, it is often very difficult to hold the vehicle against rearward movement, by the brakes, until sufficient tractive force has been furnished by the engine to start the vehicle ahead upon an upward incline and, of necessity, against the action of the brakes and to quickly enough release the brakes upon starting of the vehicle to prevent killing of the engine. My improved sprag brake, under these circumstances, may be lowered into engagement with the road bed and the brakes of the vehicle released, permitting starting of the vehicle in the same manner as if it were upon level ground or a down grade, the sprag brake being raised only after the vehicle has attained suitable headway.

Although I have illustrated and described my invention in all its details of construction, it will of course be understood that I do not wish to limit myself to such details, as various minor changes, within the scope of the appended claim, may be made at any time, without in the slightest degree departing from the spirit of my invention.

Having thus described the invention, what is claimed as new is:

The combination with a vehicle, of a sprag brake pivoted at one end to the vehicle, a substantially L-shaped bracket mounted upon the vehicle above the intermediate portion of the brake, one arm of the bracket extending substantially horizontally and being formed with an opening and with a slot communicating with the opening and extending into the other arm, and a chain connected at one end to the brake and extending through the opening of the bracket with its links lockingly engageable with the slot.

In testimony whereof I affix my signature.

JOHN F. JENNINGS. [L. S.]

Copies of this patent may be obtained for five cents each, by addressing the "Commissioner of Patents, Washington, D. C."